Patented Feb. 13, 1951

2,541,492

UNITED STATES PATENT OFFICE 2,541,492

CHLORINATED ETHYLENE POLYMER STABILIZED WITH GLYCIDYL ESTERS OF FATTY ACIDS AND METHYL GLUCAMINE

Arthur W. Anderson, North Arlington, and Sidney C. Overbaugh, Arlington, N. J., assignors to E. I. du Pont de Nemours & Company, Wilmington, Del., a corporation of Delaware No Drawing. Application July 1, 1946,
Serial No. 680,842

1 Claim. (Cl. 260—45.8)

This invention relates to the stabilization of chlorine-containing polymers and, more particularly, to the stabilization of solid, substantially non-volatile, chlorine-containing polymers against the deteriorating effects of high temperatures.

Polymers containing chlorine atoms have been found to be unstable at temperatures which are normally used for processing these polymers. It is known that phenoxypropylene oxide and dibutyl tin maleate, for example, protect the chlorinated polymers at elevated temperatures. The action of these stabilizers is not thoroughly understood but it is believed they absorb the hydrogen chloride gas evolved when the polymers are subjected to temperatures in the neighborhood of 150° C. and above. In general, it has been found that unstabilized, chlorine-containing polymers are not satisfactory for use in molding, extruding and other processing operations because of the instability of the chlorine atoms attached thereto, and consequently it has been generally recognized that a satisfactory stabilizer must be incorporated with the polymer before processing.

The primary object of this invention is to provide stabilized chlorine-containing polymers. More particularly, it is an object to stabilize chlorine-containing polymers against the deteriorating effects of high and prolonged temperatures. It is specifically an object to provide satisfactory heat stabilization for the chlorinated polymers of ethylene described in Fawcett U. S. Patent 2,183,556. Other objects will appear from the description of the invention given hereinafter.

The above objects are accomplished according to the present invention by incorporating in a solid, substantially non-volatile, chlorine-containing polymer, as a stabilizer therefor, from 0.5% to 5.0%, by weight of the polymer, of a glycidyl ester of an aliphatic acid and, in the event metal contaminants are present in the polymer, a metal deactivator. In a preferred form, the invention comprises incorporating in a solid, substantially non-volatile, chlorinated ethylene polymer, as a stabilizer therefor, from 0.5% to 5.0%, by weight of the polymer, of a glycidyl ester of a saturated aliphatic acid containing from 6 to 20 carbon atoms, inclusive.

The following examples, in which all proportions are given by weight unless otherwise indicated, illustrate specific embodiments of the invention.

EXAMPLE I

A sample of chlorinated polythene containing 58.9% by weight of chlorine and made in accordance with the disclosure of the above mentioned U. S. Patent 2,183,556, was rolled with 2%, based on the weight of the polymer, of glycidyl laurate and 1% of "C-18" alcohol as a lubricant, this latter being a mixture of alcohols of 16, 17, and, predominantly, 18 carbon atoms. A chip molded for ten minutes under 140 pounds steam pressure was light amber in color in marked contrast to a control sample of the polymer from which the glycidyl laurate was omitted. The latter resulted in a very dark brown molding. The stabilization of the chlorinated polythene was further shown upon determination of the relative amounts of decomposition taking place at 165° C. by measuring the quantity of hydrogen chloride evolved from each sample. The stabilized sample containing 2% by weight of glycidyl laurate gave off only a fraction of the hydrogen chloride obtained from the control sample.

EXAMPLE II

Samples of the resins shown in Table I were mixed on rolls with and without glycidyl laurate and taken from the rolls in the form of thin sheets. 2 parts of stabilizer were used for each 100 parts of resin. Part of each batch was cut up and heated to 165° C. in a stream of purified nitrogen and the hydrogen chloride evolved was measured each half hour for 2 hours, as shown in Table I. Chips were molded from the remainder of the material using a steam pressure of approximately 135 to 140 p. s. i. at 150° to 160° C. for periods of one and ten minutes. The colors of the chips were compared and the results are shown in Table II.

Table I

| Sample | Milligrams of Hydrogen Chloride Evolved Per 1 Gram Sample at 165° C. | | | | |
|---|---|---|---|---|---|
| | 1st ½ hr. | 2nd ½ hr. | 3rd ½ hr. | 4th ½ hr. | Total |
| polyvinyl chloride [1] | 1.3 | 0.8 | 0.6 | 0.5 | 3.2 |
| stabilized polyvinyl chloride | 0.8 | 0.3 | 0.4 | 0.4 | 1.9 |
| vinyl chloride copolymer [2] | 0.5 | 0.8 | 0.8 | 1.1 | 3.2 |
| stabilized vinyl chloride copolymer | 0.0 | 0.0 | 0.1 | 0.7 | 0.8 |
| vinyl chloride copolymer [3] [1] | 0.8 | 0.5 | 0.5 | 0.4 | 2.2 |
| stabilized vinyl chloride copolymer | 0.1 | 0.2 | 0.0 | 0.0 | 0.3 |
| chlorinated polythene [4] [1] | 0.7 | 1.2 | 1.0 | 1.0 | 3.9 |
| stabilized chlorinated polythene | 0.2 | 0.1 | 0.4 | 0.7 | 1.4 |

[1] Rolled with twenty parts of dibutyl sebacate plasticizer.
[2] Vinyl chloride/vinyl acetate copolymer, 88–90% vinyl chloride.
[3] Vinyl chloride diethyl fumarate copolymer, 95% vinyl chloride.
[4] Chlorinated polythene contains 59.8% of chlorine.

Table II

| Sample | 1-Min. Chip | 10 Min. Chip |
|---|---|---|
| polyvinyl chloride [1] | very little color | dark brown. |
| stabilized polyvinyl chloride | do | red, mottled. |
| vinyl chloride copolymer [2] | pink, mottled | brown. |
| stabilized vinyl chloride copolymer | pink, clear | light brown. |
| vinyl chloride copolymer [3] [1] | light, greenish yellow | greenish brown. |
| stabilized vinyl chloride copolymer | light pink | red, clear. |
| chlorinated polythene [4] [1] | pale yellow | light brown. |
| stabilized chlorinated polythene | very pale yellow | very light brown. |

[1] Rolled with twenty parts of dibutyl sebacate plasticizer.
[2] Vinyl chloride/vinyl acetate copolymer, 88–90% vinyl chloride.
[3] Vinyl chloride/diethyl fumarate chloride copolymer, 95% vinyl chloride.
[4] Chlorinated polythene contains 59.8% of chlorine.

EXAMPLE III

A sample of 100 parts of chlorinated polythene containing 56.8% of chlorine which was rolled with 2 parts of glycidyl stearate at 110° C. for 10 minutes, was subjected to the same test as described in Example II. The superiority of the polymer containing glycidyl stearate over the unstabilized polymer is shown in the results obtained from the hydrogen chloride evolution test as indicated in Table III.

In the chip test the glycidyl stearate prevented discoloration to a marked extent compared to the unstabilized polymer.

Table III

| Sample | Milligrams of Hydrogen Chloride Evolved Per 1 Gram Sample at 165° C. | | | | |
|---|---|---|---|---|---|
| | 1st ½ hr. | 2d ½ hr. | 3d ½ hr. | 4th ½ hr. | Total |
| chlorinated polythene | 1.7 | 1.6 | 1.2 | 1.1 | 5.6 |
| stabilized chlorinated polythene | 0.0 | 0.1 | 0.4 | 0.8 | 1.3 |

EXAMPLE IV

Samples of chlorinated polythene containing 27% by weight of chlorine, were prepared by rolling the polymer for 5 minutes at 110° C. together with the stabilizers indicated in Table IV. The samples were heated to 180° C. and the amount of hydrogen chloride evolved was measured. The color of compression molded chips of each sample was also noted.

As Table IV indicates, the glycidyl ester is superior in its stabilizing ability to the phenoxypropylene oxide both in equal weights as well as in equivalent weights.

Table IV

| Sample | Glycidyl Laurate | Phenoxy-propylene oxide | Milligrams of Hydrogen Chloride Evolved For 1 Gram Sample at 180° C. | | | | | Color of Compression Molded Chips | |
|---|---|---|---|---|---|---|---|---|---|
| | | | 1st ½ hr. | 2nd ½ hr. | 3rd ½ hr. | 4th ½ hr. | Total | Full Steam for 1 min. | Full Steam for 10 min. |
| A | 2 | | 1.1 | 0.7 | 0.5 | 0.4 | 2.7 | no color | pale yellow. |
| B | | 2 | 1.0 | 0.7 | 0.7 | 0.6 | 3.0 | do | Do. |
| C | | [1] 1.12 | 2.0 | 0.9 | 0.7 | 0.5 | 4.1 | slight yellow | yellow. |
| Control | | | 2.7 | 0.9 | 0.6 | 0.6 | 4.8 | hazy gray-brown | hazy dark gray-brown. |

[1] This quantity of phenoxy propylene oxide is chemically equivalent to 2.0 parts of glycidyl laurate.

EXAMPLE V 96 parts of chlorinated polythene containing 27% by weight of chlorine, were rolled with 2 parts of glycidyl laurate, and 2 parts of phenyl salicylate (as a light stabilizer) at 121° C. for 10 minutes. The polymer was ground in a Ball and Jewell cutter and then extruded at 171° C. into a thin sheet of approximately 5 mils thickness having a high degree of transparency. A control sample which did not contain glycidyl laurate could not be extruded at 171° C. without the formation of bubbles. Furthermore the control sample turned dark brown upon extrusion at this temperature.

EXAMPLE VI

A sample of 10 parts of chlorinated polythene containing 56.8% chlorine, was rolled with 0.1 part of "C–18" alcohol as a lubricant and 0.2 part of glycidyl undecylenate at 110° C. for 3 minutes. Chips were compression molded under steam pressure of about 135 p. s. i. at 150° to 160° C. for 10 minutes from both the stabilized sample as well as a similar sample not containing the glycidyl undecylenate. The color of the unstabilized chip was brown, whereas that of the stabilized chip was very lightly colored. The latter sample was better in color than a chip made under similar conditions using glycidyl laurate in place of glycidyl undecylenate.

EXAMPLE VII

Samples of a batch of chlorinated polythene containing 30% by weight of chlorine, were incorporated with various metal deactivators and glycidyl laurate in hot toluene. The solvent was removed and the samples examined for stability at a temperature of 165° C. in nitrogen as measured by the evolution of hydrogen chloride over a 2 hour period. Chips were also molded from the same compositions at a temperature of 120 p. s. i. of steam for 10 minutes. The effect of the metal deactivators on the chlorinated polythene is shown in Table V.

Table V

| Sample | Modifiers (per cent based on weight of resin) | Mg HCl/g. of resin | Color [1] |
| --- | --- | --- | --- |
| 1 | 1% glycidyl laurate | 1.9 | 3 |
| 2 | None | 3.0 | 4 |
| 3 | 1% of thiosorbitol | 2.7 | 4 |
| 4 | 1% of thiosorbitol and 1% of glycidyl laurate | 1.8 | 4 |
| 5 | 0.1% of methyl glucamine plus 1% of glycidyl laurate | 1.8 | 2 |
| 6 | 0.1% of phenyl biguanide plus 1% of glycidyl laurate | 2.4 | 2 |
| 7 | 0.1% of thiosemicarbazide plus 1% of glycidyl laurate | 2.0 | 2 |

[1] Color is rated as 1 (colorless) to 10 (black).

It will be understood the above examples are merely illustrative and the present invention broadly comprises stabilizing a solid, substantially non-volatile, chlorine-containing polymer by incorporating therewith a glycidyl ester of an aliphatic acid and, if desired, a metal deactivator.

Chlorine-containing polymers adapted to be stabilized according to the present invention include any which are solids and substantially non-volatile. The reason the invention is applicable to this broad class of polymers presumably is because the stabilizer acts specifically with respect to the chlorine content in the polymer and independently of the chemical structure of the polymer. It is immaterial whether the polymer is an "after chlorinted" polymer or a polymer of a compound containing one or more chlorine atoms in its monomeric state. The utility of the invention is greatest with respect to those polymers exhibiting the greatest instability at the temperature to which they must be subjected in processing them, but, in general, the invention is useful with respect to any of these polymers that are subject to deterioration by the action of heat and/or the catalytic activity of metals which effects cause the polymers to become brittle, discolored, or otherwise deteriorated.

Included among the polymers suitable for stabilization by the present process are chlorinated rubbers of various chlorine contents; polymers and copolymers of 2-chloro-butadiene; vinyl, and vinylidene polymers and copolymers such as vinyl chloride, vinylidene chloride, chlorotrifluoroethylene, copolymers of vinyl chloride with vinyl esters such as vinyl acetate and the dialkyl fumarates, and after chlorinated polymers of the above as well as the products obtained by chlorinating polymers of ethylene, such products containing usually 20% to 80% chlorine; chlorinated polymers and copolymers of acrylic and methacrylic compounds such as ethyl and methyl methacrylate, acrylonitrile; vinyl ethers, and olefins such as isobutylene and propylene.

In the practice of the invention any glycidyl ester of an aliphatic acid may be used but those esters prepared from aliphatic acids having from 6 to 20 carbon atoms, inclusive, are preferred because of their low volatility and commercial availability. Among the glycidyl esters adapted for use in the invention are the esters of fatty acids such as the monoglycidyl esters of stearic acid, lauric acid, undecylenic acid, palmitic acid, caprylic acid, capric acid, oleic acid, and the like. Diglycidyl esters which are effective, include the diglycidyl esters of adipic acid, pimelic acid, suberic acid, azelaic acid, sebacic acid, and the like. Aromatic glycidyl esters have some stabilizing action on the chlorine-containing polymers but they are by no means as desirable because of the tendency to produce color in the polymers. The preparation of the glycidyl esters herein considered is well-known in the art and they may be prepared by any suitable method such as that described by Kester et al., Journal Organic Chemistry, vol. 8, pages 550–556 (1943).

For any normally encountered chlorine-containing polymer the optimum amount of the glycidyl ester to achieve satisfactory stabilization will fall between 0.5% to 5.0% by weight of the polymer. It is preferred to use from 1% to 3%, by weight of the polymer, of the glycidyl ester. The optimum amount of glycidyl ester within the ranges stated above depends upon the particular chlorine-containing polymer being stabilized as well as the purity of the polymer because it has been found that polymers not sufficiently purified from chlorination reactions contain residual hydrogen chloride which will greatly increase the tendency of the polymer to discolor and decompose at high temperatures. In such cases a greater percentage of stabilizer would necessarily have to be used to effect the same degree of stability.

It is a recognized fact that metals and their catalytically active compounds accelerate the rate of oxidation of many organic substances. For example, it is well known that copper compounds speed the formation of gum in cracked gasoline as well as the ageing of rubber and that manganese promotes the ageing of rubber; further, they also accelerate the oxidation of certain antioxidants used to stabilize these organic substances. In order to overcome these difficulties, it has been proposed by Downing and Pedersen in U. S. Patent 2,336,598 and U. S. Patent 2,363,778 as well as by others to use metal deactivators, i. e., compounds capable of effectively suppressing the catalytic activity of metals and their salts. The theory as to the manner in which the metal deactivators function in combination with antioxidants is fully discussed in these patents. It is also pointed out therein that the antioxidants are specific to the type of organic substance being stabilized, and that the metal deactivators are specific for the particular metal and its compounds and are independent of the organic substance being treated.

This invention is further concerned with modifiers for chlorine-containing polymers. Notwithstanding the fact that the aliphatic glycidyl esters are superior stabilizers for chlorine-containing polymers, it has been found that the particular combination of an aliphatic glycidyl ester and a metal deactivator is in some cases more effective for stabilizing the chlorine-containing polymers possessing metallic contaminants than either the stabilizer or the metal deactivator alone.

Traces of metals such as iron, copper, zinc and aluminum have a deleterious effect upon the stability of the chlorine-containing polymers. These metals either occur in the raw materials used for producing the polymers, or they may be introduced during the polymerization or chlorination steps, either by accident or by the use of modifiers, or contamination of the finished polymer may result by rolling, molding, extruding, and other processing operations.

It is probable that in chlorine-containing polymers the metals catalyze the chemical reactions which involve splitting out of hydrogen chloride, oxidation and cross-linking of the polymer. These reactions are characterized by an increase in color and later by embrittlement of the polymer. Iron and copper are the particularly deleterious contaminating metals which normally occur in small amounts in the chlorine-containing polymers of this invention.

Among the iron deactivators found suitable for use together with an aliphatic glycidyl ester in chlorine-containing polymers are thiosemicarbazide, phenyl biguanide, methyl glucamine and thiosorbitol. N.N' - disalicylal ethylenediamine was found particularly effective as a deactivator for copper when used in conjunction with an aliphatic glycidyl ester in chlorine-containing polymers.

The metal deactivators may be used in proportions varying from 0.01% to 5.0% by weight, based upon the weight of the polymer. However, it is usually satisfactory to use between 0.1% and 1.0% of the metal deactivator. The exact optimum proportion of metal deactivator will naturally depend upon the amount of metal contaminant present in said polymer.

The glycidyl esters and metal deactivators may be incorporated with the chlorine-containing polymers by any convenient method, e. g., by mixing on heated rolls, by dissolving the stabilizers in a solution of the polymer and evaporating the solvent, by steeping the polymer in a solution of the stabilizers followed by removal of the solvent, or by suspending the stabilizers in a solution of the polymer in which they are not soluble and precipitating the polymer in a state of intimate mixture with the stabilizers by adding a liquid which is miscible with the solvent but is itself a non-solvent for the polymer and the stabilizers under the conditions of working. However, in order to avoid decomposition of the polymer during the incorporation, it has been found that it is preferable to dissolve the polymer, glycidyl ester and metal deactivator in a mutual solvent, followed by evaporation of the solvent.

The chief advantages of the compositions of this invention derive from the fact that the chlorine-containing polymers are rendered stable to fabricating temperatures without decomposing or discoloring to any appreciable extent. Thus, for example, the chlorinated polymers of ethylene may be rolled, molded, extruded, calendered, cast or otherwise processed into various shapes to yield useful articles. Furthermore, these articles may be made transparent or translucent, either essentially colorless or in a variety of colors, by the addition of suitable pigments and dyes. Transparent films may be cast from the compositions of this invention, or thin, flexible, transparent sheeting may be prepared by extrusion or calendering. It has been found that small proportions of a microcrystalline wax materially aid in the extrusion of the stabilized chlorinated ethylene polymer compositions. The stabilized sheeting is useful for the preparation of raincoats, handbags, garment bags, upholstery, shower curtains, crib sheeting, baby pants, aprons, closures, suspenders, belts, wallets, wrappings, covers, food packaging and the like.

The stabilized compositions may be used per se, or in admixture with fillers, solvents, plasticizers and other modifiers, for the manufacture of filaments, fabrics, yarns, coatings on metal or wood, tubing for pipes and hose and impregnated and laminated articles. However, one of the most important advantages of the stabilized chlorinated ethylene polymer compositions is the fact that these compositions are serviceable without the addition of any plasticizer for sheeting and other applications. These compositions are flexible and may be handled as readily as the chlorinated vinyl polymers so widely used heretofore, but there is no plasticizer loss on ageing and none to bleed out and leave a progressively harder and more brittle polymer as in the case of the chlorinated vinyl polymers which require plasticizers before they can be used.

As many apparently widely different embodiments of this invention may be made without departing from the spirit and scope thereof, it is to be understood that the invention is not limited to the specific embodiments thereof except as defined in the appended claim.

We claim:

A composition comprising a solid, substantially non-volatile chlorinated ethylene polymer and, as a stabilizer therefor, 1.0%–3.0%, by weight of the polymer, of a glycidyl ester of a fatty acid containing from 6 to 20 carbon atoms, inclusive, and 0.1%–1.0% of methyl glucamine as a metal deactivator.

ARTHUR W. ANDERSON.
SIDNEY C. OVERBAUGH.

REFERENCES CITED

The following references are of record in the file of this patent:

UNITED STATES PATENTS

| Number | Name | Date |
|--------|------|------|
| 2,448,602 | Kester | Sept. 7, 1948 |

FOREIGN PATENTS

| Number | Country | Date |
|--------|---------|------|
| 418,230 | Great Britain | Oct. 22, 1934 |

OTHER REFERENCES

Elam et al.: Modern Plastics, 20, pages 95–97 (May 1943).